Oct. 20, 1936.   C. A. BRAGUNIER   2,057,877
AUTOMATIC TORQUE CONTROL FOR AIRCRAFT
Filed March 19, 1935
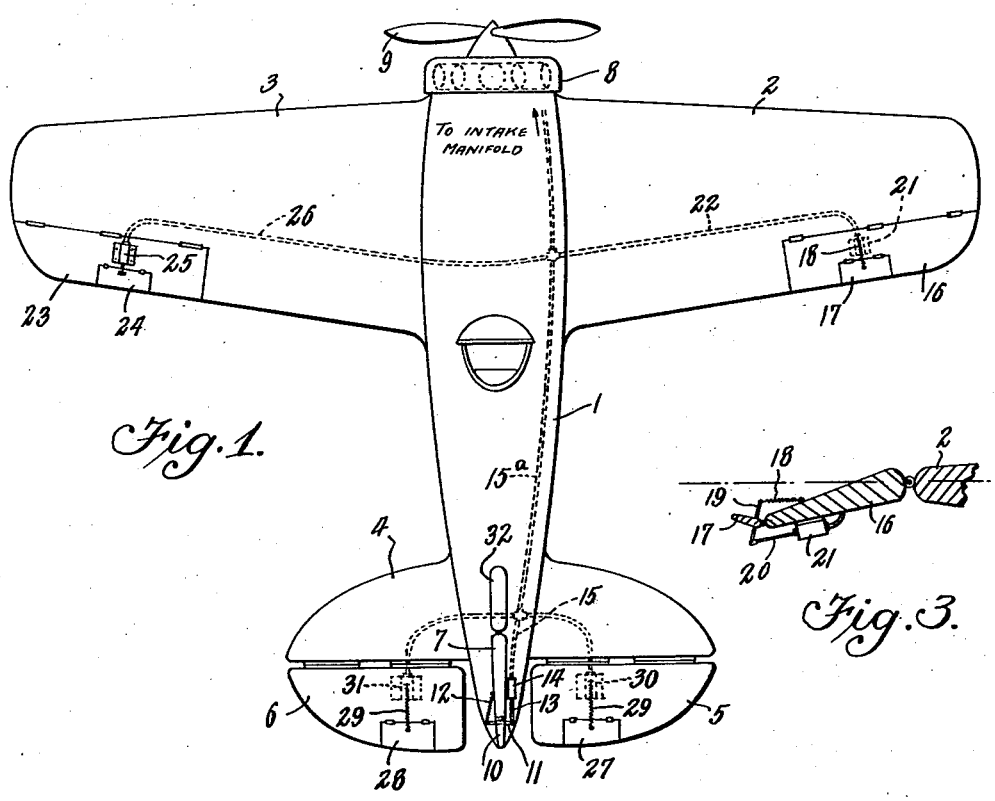
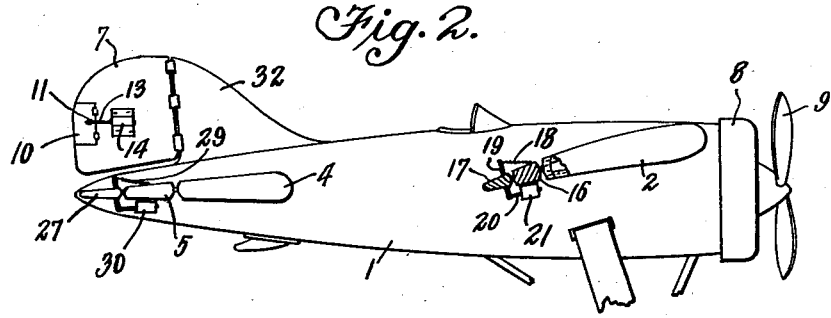
INVENTOR.
Clarence A. Bragunier
BY Lyon & Lyon
ATTORNEYS Patented Oct. 20, 1936

2,057,877

UNITED STATES PATENT OFFICE 2,057,877

AUTOMATIC TORQUE CONTROL FOR AIRCRAFT

Clarence A. Bragunier, Los Angeles, Calif., assignor of one-half to Martin Daniel King, III, Los Angeles, Calif.

Application March 19, 1935, Serial No. 11,796

4 Claims. (Cl. 244—29)

My invention relates to aircraft and has particular reference to a method and means for automatically compensating for variation in the torque produced in an airplane or other aircraft due to variations in the speed of the propeller or other power apparatus therefor.

In the construction and handling of aircraft it is well-known that the rotary movement of the propeller produces a torque reaction in the aircraft itself tending to rotate the aircraft in a direction opposite to the rotary movement of the propeller, and it is also well-known that this torque varies with variations in the speed of the propeller. That is, when the airplane has been traveling with the propeller operating at a predetermined number of revolutions per minute and the speed of the engine is suddenly or rapidly increased, the torque effect upon the aircraft is such as to cause the aircraft to twist from its previous course, tending to swing the entire aircraft around its horizontal axis in a direction opposite to the rotation of the propeller. At the same time this torque produced in the airplane by the sudden or rapid increase in speed in the propeller, tends to swing the aircraft about its vertical axis, requiring that the pilot must operate the rudder to compensate for the increased torque and must also, or should also, operate the ailerons to further compensate for the change of torque.

Again, when the airplane is landing, the closing of the throttle of the engine immediately prior to gliding into the field, causes a sudden cessation or reduction of the torque effect upon the aircraft and again it is necessary that the pilot shall consciously operate the ailerons and the rudder to compensate for this suddenly reduced torque in order to make a proper landing.

Also, it is the common practice to "trim" the airplane for operation with its horizontal axis parallel to the ground when flying with a predetermined speed of rotation of the engine. With the aircraft trimmed in this manner the sudden reduction in speed of the propeller tends to make the airplane "nose heavy"; that is, to point downwardly, and unless the elevators are consciously actuated by the pilot to overcome this "nose heavy" condition of the airplane considerable difficulty or danger is encountered.

It is an object of my invention to provide means which will automatically adjust the rudder, the elevators, the ailerons, and/or other control devices of the aircraft in response to changes in speed of operation of the engine or the propeller driven thereby to compensate for the change in torque or change in the "trim" of the airplane while being flown.

Another object of my invention is to provide a rudder and/or vertical fin elements of an aircraft, and means for automatically adjusting the position of the rudder in response to variation in the speed of operation of the propeller of the aircraft.

Another object of the invention is to provide an aircraft having a rudder with means for automatically adjusting the position of the rudder to compensate for changes in the reactive torque produced in the airplane in response to the changes in speed of the propeller thereof.

Another object of the invention is to provide an aircraft having elevators, with means for automatically adjusting the elevators, or other horizontal airfoil elements of the aircraft, to trim the aircraft for substantially horizontal flight conditions in response to changes in speed of the engine of the aircraft.

Another object of the invention is to provide an aircraft having ailerons with means for automatically adjusting the setting of the ailerons in response to variations in speed of the propeller of the aircraft.

Other objects and advantages will be apparent from a study of the following specifications, read in connection with the accompanying drawing, wherein Figure 1 is a top plan view of an airplane equipped with automatic torque adjusting devices constructed in accordance with my invention;

Fig. 2 is an elevational view of the aircraft shown in Fig. 1, equipped with my torque adjusting devices; and Fig. 3 is a detail view of one of the ailerons of the airplane illustrated in Figs. 1 and 2, showing the aileron in its adjusted position.

Referring to the drawing, I have illustrated an aircraft having a fuselage 1 to which is attached suitable wings 2 and 3. The aircraft is also provided with a suitable stabilizer 4, to which is attached elevators 5 and 6, and a rudder 7 is provided at the tail of the fuselage 1. An engine 8 is diagrammatically illustrated at the forward end of the fuselage 1 connected by any suitable means to a propeller 9 by which the aircraft is driven.

The rudder 7 is illustrated as having a small section 10 formed at the rear edge thereof so that by moving the section 10 the main body of the rudder 7 will be moved in a direction substantially equal but opposite to the degree of movement of the section 10 from its neutral position (that is, aligned with the longitudinal axis of the body of the rudder 7). The section 10 is illustrated as having a control rod 11 extending laterally therethrough to one end of which is connected a biasing spring 12 normally urging the section 10 toward the left, as viewed in Fig. 1. The opposite end of the control rod 11 is connected to a link 13 terminating in a suitable piston (not shown) operating in a cylinder 14 so that by applying suitable pressure or vacuum to the cylinder 14 the section 10 of the rudder may be moved against the force of the spring 12.

As will be understood by those skilled in the art, the rotation of the propeller 9 at a predetermined speed will produce a predetermined torque reaction in the body of the airplane, which will require a predetermined adjustment of the rudder 7 to compensate therefor to hold the plane upon a true straight-line course. If the piston and cylinder 14 are so connected to some operating part of the engine 8 which will respond to the speed of the engine the rudder 7 will be automatically positioned at the correct angle to the neutral as will compensate for this degree of torque. To accomplish this result, I prefer to connect the cylinder 14 by means of a suitable flexible hose 15 to a pipe 15ª leading to the intake manifold of the engine 8 so that with a predetermined setting of the throttle of the engine 8 a predetermined vacuum will be created in the intake manifold and a predetermined force will be exerted upon the piston in the cylinder 14 to pull the section 10 of the rudder against the force of the spring 12 to such position as will compensate for the torque produced by the engine at that speed of operation.

If, however, the throttle is opened to increase the speed of the engine, the vacuum present in the pipe 15ª is reduced and the spring 12 will automatically swing the rudder section 10 and cause the rudder 7 to be moved away from the neutral position by an amount corresponding to the increased speed of the propeller 9.

On the other hand, when the airplane is to be landed, the closing of the throttle for the final gliding into the landing field will cause the propeller 9 to slow down to such degree as will produce substantially no reactive torque in the airplane, at which time the vacuum in the intake manifold will be increased to its highest value and will cause the rudder section 10 to be pulled to the neutral position, as indicated in Fig. 1 herein.

Thus at the time there is substantially no torque produced in the aircraft and the rudder is automatically set at its neutral position.

It will be understood by those skilled in the art that the automatic operation of the rudder section 10 and the rudder 7 will in nowise interfere with the normal operation of the rudder 7 by its normal controlling mechanism under the manual manipulation of the pilot, since the cylinder 14 is mounted upon the movable section of the rudder and will operate to perform its compensating effects independent of the angle to which the rudder has been moved by the manual control actuated by the pilot.

The wing 2 is illustrated as being provided with an aileron 16 which is under the manual control of the pilot and which is also provided with a small movable section 17 similar to the section 10 described for the rudder 7. This section 17 is normally urged, by means of a spring 18, in an upward direction, as shown in Fig. 3, but like the rudder section 10 is provided with a control rod 19 connected by means of a link 20 to a piston operating in a cylinder 21. The cylinder 21 is connected through a suitable flexible hose 22 to the pipe 15ª leading to the intake manifold of the engine so that in response to variations in the speed of the engine 9 the movable section 17 of the aileron 16 will be adjusted to correspond to the engine speed.

The opposite wing 3 is similarly provided with an aileron 23 having a movable section 24 normally urged by means of a spring, not shown, in a downward direction, opposed by a cylinder 25 connected through a pipe 26 to the pipe 15ª so that upon an increase in the speed of operation of the engine 8 the aileron section 24 will be moved downwardly, while the aileron section 17 will be moved upwardly, thus causing reverse operation of the ailerons 23 and 16 which, as will be understood by those skilled in the art, will automatically oppose the torque effect of the increased speed of the engine. In like manner, when the airplane is to be landed and the motor throttle is closed, the effect of the increased vacuum in the pipes 22 and 26 will cause the sections 17 and 24 to be returned to their neutral position and the airplane will be converted into a substantial glider for effecting the landing. It will also be understood that suitable stop mechanism, not shown, will be provided to prevent the increased vacuum in the engine from swinging the movable sections 10, 17 and 24 past the neutral position.

Again, in order to compensate for the effect upon the airplane of a sudden change in the speed of the engine, or its propeller creating a nose heavy condition of the aircraft, I provide small movable sections 27 and 28 upon the respective elevators 5 and 6, each of which is provided with a spring 29 tending to swing the movable sections downwardly, (and thus tending to swing the elevators upwardly). A piston and cylinder mechanism 30 is provided upon the elevator 5 for drawing the movable section 27 back toward its neutral position upon increased vacuum conditions in the engine 8, while a similar piston and cylinder 31 is employed for performing the same service for the section 28 on the elevator 6. Thus when the propeller is slowed down for the purpose of effecting a landing, and the nose heavy condition of the airplane occurs, the cessation of the high vacuum in the engine 8 will cause the cylinder and piston 30 to swing the movable sections 27 and 28 of the elevators downwardly and thus swing the elevators 5 and 6 upwardly to compensate for the nose heavy condition of the aircraft, while increased speed of the engine, reducing the vacuum, will permit the spring 29 to swing the movable sections 27 and 28 upwardly, returning the elevators toward their neutral position.

It will therefore be observed that wherever the changes in engine speed would create a reactive torque in the aircraft, such reactive torque is compensated for by an automatic adjustment of the controls of the aircraft by an amount and in the direction necessary to overcome the effects of the reactive torque.

While I have illustrated the preferred operation of my compensating devices through the agency of the vacuum created in the manifold of the engine 8, will be apparent to those skilled in the art that other functions of the engine speed may be employed as the controlling elements, such as the oil pressure in the oil system of the engine, which varies in accordance with the changes of speed of the engine, or the cylinder head pressure may be employed for producing a pressure instead of a vacuum for controlling the piston and cylinder mechanisms 14, 21, 25, 30 and 31, or a governor mechanism responsive to variations in speed in the engine may be provided as the means for providing the desired power for operating the automatic compensating devices.

Also, while I have illustrated and described the ailerons, rudder and elevators as controlled by movement of a small section of each of these members, it will be understood by those skilled in the art that each of these members may be bodily moved by the piston and cylinder apparatus if such construction appears to be desirable.

It will also be understood by those skilled in the art that instead of automatically operating the usual "controls" of the aircraft, such as rudder, ailerons, and elevators, for torque compensation, I may provide additional and separate "controls" for this purpose, such as the vertical fin 32, which normally lies in advance of the rudder and may be movably mounted or may have a movable section therein which can be actuated by the piston 14 as a substitute for actual control of the movement of the rudder. Similarly the horizontal stabilizers 4 may either be mounted for bodily movement or may be provided with movable sections which will be actuated by the cylinders and pistons, such as 30 and 31, and perform the automatic torque correction in place of movement of the elevators 5 and 6.

While I have shown and described the preferred embodiment of my invention, it is to be understood that I do not wish to be limited to any of the details shown herein, except as defined in the appended claims.

I claim:

1. In a single-motored aircraft including a body member and a single propeller with means for rotating the propeller with respect to the body member whereby the propeller exerts a reactive torque upon the body member proportional to the resistance to motion of the propeller, vane means on said body member movable into different positions to variably oppose motion of the body member induced by the said reactive torque of the propeller, and means responsive to variations in the said reactive torque of said propeller on said body member for moving said vane means in such direction as to compensate at least in part for variations in the reactive torque of the propeller upon the body.

2. In a single-motored aircraft including a body member and a single propeller with means for rotating the propeller with respect to the body member whereby the propeller exerts a reactive torque upon the body member proportional to the resistance to motion of the propeller, vane means on said body member movable into different positions to variably oppose motion of the body member induced by the said reactive torque of the propeller, and means responsive both to changes in the reactive torque of said propeller and to changes in speed of the propeller for moving said vane means in such direction as to compensate at least in part for variations in the reactive torque of the propeller upon the body.

3. In a single-motored aircraft including a body member and a single propeller with an engine for rotating the propeller with respect to the body member, whereby the engine exerts a reactive torque upon the body member proportional to the resistance to motion of the propeller, vane means on said aircraft movable into a plurality of positions to variably oppose motion of the body member induced by the reactive torque exerted thereon by the engine, and means responsive to variations in the load on said engine for moving said vane means in such direction as to compensate at least in part for variations in the reactive torque exerted by the engine upon the body member in response to variations in the resistance to motion of the propeller.

4. In an aircraft, a body member and a propeller with an internal combustion engine for rotating the propeller with respect to the body member whereby the engine exerts a reactive torque upon the body member proportional to the resistance to motion of the propeller, said engine having an intake manifold and a fuel supply means with a throttle interconnecting said fuel supply means to said intake manifold, vane means on said body member movable into different positions to variably oppose motion of the body member induced by the reactive torque applied to the body member by the engine, and means responsive to variations in pressure in said intake manifold for moving said vane means whereby the torque compensating action of the vanes on the body member is increased in response to a reduction in manifold pressure.

CLARENCE A. BRAGUNIER.